United States Patent [19]

Lagess et al.

[11] 3,887,462

[45] June 3, 1975

[54] DISPOSAL OF WASTE STREAMS CONTAINING ASBESTOS

[75] Inventors: Thomas F. Lagess; Valroy Henry Maudlin, both of Lake Jackson, Tex.

[73] Assignee: The Dow Chemical Company, Midland, Mich.

[22] Filed: June 7, 1974

[21] Appl. No.: 477,241

[52] U.S. Cl. ................................................ 210/53
[51] Int. Cl. ............................................. C02b 1/20
[58] Field of Search ....................... 210/42, 45–47, 210/51–54, 59; 162/153–155

[56] References Cited
UNITED STATES PATENTS

| | | | |
|---|---|---|---|
| 2,593,125 | 4/1952 | Eaton et al. | 162/153 X |
| 2,707,171 | 4/1955 | Miller | 210/42 X |
| 3,224,965 | 12/1965 | Woolery | 210/51 X |
| 3,368,936 | 2/1968 | De Long | 162/155 X |
| 3,446,731 | 5/1969 | Harsh | 210/53 X |
| 3,510,394 | 5/1970 | Cadotte | 162/153 X |

*Primary Examiner*—Thomas G. Wyse
*Attorney, Agent, or Firm*—Walter J. Lee

[57] ABSTRACT

Aqueous waste streams containing asbestos are pumped into underground cavities, such as brine wells, and the asbestos is caused to sink to the bottom of the cavities by being contacted with a relatively dense, finely divided insoluble settling agent, such as limestone. This provides safe disposal of waste asbestos, which otherwise could create a health or environmental problem.

10 Claims, No Drawings

DISPOSAL OF WASTE STREAMS CONTAINING ASBESTOS

BACKGROUND OF THE INVENTION

Industries which employ asbestos materials are frequently faced with the problem of disposing of waste streams which contain relatively small percentages of asbestos. Disposal of such asbestos must be done in such a manner that the environment is protected and health and safety of workers and other people are not endangered. Waste streams containing asbestos should not be permitted to flow into bodies of water which serve or affect lives of animals or humans. The disposal of waste asbestos in such places as open pits or in landfill operations can pose an environmental problem in that it can become eluted into nearby waters or dry asbestos particles can easily become airborne.

There exists a need, then, for a safe, ecologically beneficial manner of disposing of waste asbestos which cannot be efficiently and economically recovered and re-cycled.

SUMMARY OF THE INVENTION

It has now been discovered that waste asbestos carried in aqueous waste streams can be safely disposed of in underground cavities. Problems associated with such method of disposal in underground cavities, from which it may be desired to extract aqueous streams, are overcome by contacting the asbestos with a relatively dense settling agent which attaches to the asbestos and causes it to sink to the bottom of the cavity. By the term "relatively dense" it is meant that the settling agent will easily sink to the bottom in an aqueous mixture, including concentrated brine.

The settling agent may be a finely divided rock or mineral, especially one which contains appreciable amounts of alkaline earth metal compounds. In some instances, relatively small amounts of water-soluble or water-miscible organic flocculating agents are added to aid the settling. Care should be taken to avoid aeration of the asbestos slurry because the asbestos, which contains tiny pores and voids, can capture small air bubbles within its fibrous structure and this makes settling more difficult.

DETAILED DESCRIPTION OF THE INVENTION

In general, the invention comprises the safe disposal of aqueous streams containing asbestos in underground cavities whereby the asbestos is caused to settle to the bottom of the cavity by the action of relatively dense settling agents. The amount of settling agent which is used is at least about an equal weight of settling agent to asbestos (based on dry weight). Preferably, at least about 3 times as much, by weight, of settling agent to asbestos is employed. By "relatively dense", it is meant that the settling agent settles relatively quickly in the aqueous body of water in which it is employed; its apparent density should be greater than about 1.2 gms/cc.

The settling agent may be any particulate or finely divided rock or mineral which is substantially insoluble in the aqueous medium, is relatively dense, and which has an affinity for finely divided asbestos. Preferably, the settling agent is a finely divided material which contains substantial amounts of alkaline earth metal compounds, such as limestone, Portland cement, dolomite, magnesium hydroxide, calcium carbonate, barite, gypsum, drilling mud or mixtures containing two or more of these.

There is no particular limit on the particle size of the settling agent except that it should not be so finely divided as to be essentially colloidally suspended in aqueous mixtures; neither should it be, for obvious reasons, so large in particle size that its surface area to volume ratio is impractical for pumping or for economical utilization of its potential settling ability. Ordinarily, particles which pass through about a 10 mesh size sieve (U.S. Standard Sieve size) are operable, and may be, ordinarily, as small as about one micron.

PREFERRED EMBODIMENT

In one particular and preferred embodiment, aqueous asbestos-containing waste streams obtained from the process of depositing asbestos diaphragms onto porous electrolytic cell cathodes is mixed with "sludge" from a brine purifier and pumped into a brine well from whence the brine was mined. In such embodiment, asbestos-containing aqueous waste waters come from the washing of old, spent, asbestos diaphragms from the porous cathode and from the vacuum-depositing of new asbestos diaphragms onto the cathodes. The cathodes are employed in an electrolytic cell which decomposes brine into caustic and chlorine. The brine comes from a brine well and is purified before being sent to the electrolytic cell. The "sludge" obtained from the brine purifier is generally considered to be a waste material which requires disposal. The underflow from the brine purifier is normally about 80% to about 95% brine and about 5% to about 20% of a "sludge" mixture of solid material which is predominantly finely divided calcium carbonate and a minor amount of magnesium hydroxide along with small quantities of other materials. This sludge is ideally suitable for use as the settling agent in the present invention.

In some brine wells, water is normally pumped into salt(NaCl) deposits underground to dissolve the salt and the brine that is formed is pumped out. Eventually there is formed a large cavity underground where the salt has been removed. Into this cavity the aqueous mixture of asbestos and settling agent may be pumped. The asbestos is caused to settle to the bottom where it forms a relatively tightly compacted layer and asbestos-free brine can still be pumped from the well for use in electrolytic chlorine cells.

Thus, the safe disposal of asbestos waste material can be done not only in abandoned, depleted salt wells, but also in active, producing wells. Other underground cavities, such as abandoned sulfur wells, are also suitable depositories for waste asbestos.

If the settling agent is omitted from the asbestos-containing aqueous stream, the asbestos particles will, when pumped into a brine well, tend to disperse in the brine well and some will even float to the top. Brine pumped out would contain asbestos and this is undesirable as it would increase the amount of purification required before the brine could be pumped into the electrolytic cell.

The use of a settling agent is desirable, in accordance with the present invention, even when it is desired to deposit waste asbestos in underground reservoirs or cavities which do not contain brine. Asbestos fibers will normally settle to the bottom of plain water, but by using a settling agent, the volume of "thickened slurry" occupied by the asbestos in the bottom portion of water is much less than when no settling agent is used. This "compaction" of the layer of thickened slurry is synergistically enhanced by using a water-soluble or water-miscible flocculating agent in addition to the settling agent.

Even though the preferred embodiment described herein is directed to the safe disposal of asbestos from a cathode-washing operation, it will be obvious to persons skilled in the art that other aqueous dispersions of asbestos waste materials may be safely disposed of in accordance with the present invention.

EXAMPLE 1

(Comparative; not example of invention)

Water is used in washing asbestos from the cathodes which have been removed from an electrolytic cell in order that new asbestos diaphragms may be deposited on the cathodes. This wash water waste, containing asbestos, is called "cathode washer slurry."

A 1,000 ml. portion of cathode washer slurry (at about 23.C), containing about 0.1% asbestos, was placed in a one-liter graduated cylinder and the settling rate was measured. The asbestos was seen to settle at a rate of about 10.7 cm per minute. Settling occurred until the asbestos was concentrated in the bottom 200 ml. of the cylinder where it "stabilized" and settled no further. It was found that the asbestos was not tightly packed (the bottom "thickened" slurry contained about 1 gram of asbestos) and was easily re-dispersed by only slight agitation.

The top 800 ml. of water was decanted, leaving only the 200 ml. of thickened slurry in the cylinder. When 800 ml. of saturated brine was added to this thickened slurry, the asbestos floated to the top. Vacuum de-aeration of the brine-asbestos slurry did not cause the asbestos to sink in the brine.

EXAMPLE 2

(Effect of Adding Settling Agent)

To the brine/asbestos mixture of Example 1 there was added 4 grams of sludge solids (predominantly $CaCO_3$ and $Mg(OH)_2$) and this caused the asbestos to settle at a rate of 10.3 cm/minute. The asbestos was concentrated in the bottom 75 ml. of the cylinder and it was found that there was very little disturbance of this concentrated layer by the same amount of slight agitation which had been used in Example 1.

EXAMPLE 3

(Comparative; not example of invention)

For this laboratory experiment there was used a cylindrical clear tube about 9.5 cm. inside diameter and about 1.76 meters tall which was filled with saturated brine.

Into the bottom of the column there was slowly injected 40 ml./0.5 hr. for about 6 hours of the cathode washer slurry. This caused displacement of some of the brine from the top of the tube. The fibers dispersed, during the injection, very evenly throughout the column of brine. After the injecting was completed the column was allowed to stand at rest and it was found that most of the asbestos fibers floated to the top.

EXAMPLE 4

(Effect of Adding Settling Agent)

The procedure of Example 3 was followed except that an amount of sludge solids of about three times the amount (by dry weight) of asbestos was added according to the present invention. At the same slow rate of injection the asbestos did not reach the top of the brine column and after the injecting was finished, the fibers settled to the bottom.

EXAMPLE 5

In order to test the invention in an underground cavity, cathode washer slurry was mixed with an excess of sludge (greater than 1/1 based on dry weight of sludge-solids/ asbestos) was injected into an operating brine well over a period of several months. During this time, brine was being taken from the well for use in electrolytic cells and it was found, by frequent sampling, that none of the disposed asbestos was being removed from the well with the brine.

EXAMPLE 6

In accordance with the procedure of Example 2, it is found that limestone, Portland cement, dolomite, gypsum, magnesium carbonate, magnesium hydroxide, calcium carbonate, sand and mixtures of these also cause settling of asbestos in brine and in water.

EXAMPLE 7

(Comparative Tests for Synergism)

Run A:

Into a 1-liter graduated cylinder, containing about 1 liter of $H_2O$, there was added 1.3 grams of asbestos fibers from a "spent" diaphragm off a cathode. The mixture was agitated and allowed to stand. The asbestos settled into a "thickened slurry" layer which occupied 225 cc. Thus the fibers were concentrated in the lower 22.5% of the volume.

Run B:

In similar fashion to Run A, except that concentrated brine was used instead of water, the asbestos fibers tended to remain suspended and most fibers actually rose to the top.

Run C:

In similar manner to Run A, but with 5 gms. of limestone (particle size in the range of about +200 to −140, U.S. Standard Sieve Size) added thereto, the asbestos and limestone settled into the lower 120 cc (or lower 12%) of the cylinder.

Run D:

In similar manner to Run A, but with 2 ppm of polyacrylamide (Purifloc) added, the asbestos settled into the lower 130 cc. (or lower 13%) of the cylinder.

Run E:

Using the procedure of Run A, but adding both the limestone of Run C and the polyacrylamide of Run D, the asbestos settled into the lower 85 cc (or 8.5%) of the cylinder.

It is found that the limestone employed in Run C provides substantially that same result as obtained in Run C if the ratio of limestone/asbestos is varied over the range of about 3 to 5. Also, when polyacrylamide in Run D is employed over the range of about 2 to 10 ppm then the results obtained are substantially the same as in Run D.

EXAMPLE 8

In like manner to Run A in Example 7 above, it is found that the addition of 5 gms. of drilling mud causes settling of the asbestos into the lower 105 cc (or 10.5%) volume. When 2 ppm of the flocculating agent (polyacrylamide) is also added with the drilling mud, the asbestos settles into the lower 80 cc (or 8.0%) volume.

EXAMPLE 9

In like manner to Run B of Example 7 above (which uses concentrated brine), it is found that the use of limestone or drilling mud (as used in Examples 7 and 8) give substantially the same results as when water is used in the cylinder. Furthermore, the use of the flocculating agent (polyacrylamide) as in Examples 7 and 8 provides substantially the same results in concentrated brine as in water.

EXAMPLE 10

Limestone was screened into the following listed sieve fractions or "cuts" employing U.S. Standard Sieves: +40 to −30, +50 to −40, +70 to −50, +100 to −70, +140 to −100, and −325.

Each of these fractions were found to be effective in settling asbestos fibers in concentrated brine.

I claim:

1. A method of safe disposal of asbestos-containing aqueous waste material, which comprises admixing a finely divided, relatively dense, substantially insoluble settling agent to said asbestos-containing aqueous waste material, and conveying the mixture to an underground cavity.

2. The method of claim 1 wherein said settling agent is a finely-divided inorganic material containing at least one alkaline earth metal compound.

3. The method of claim 1 wherein said settling agent is at least one of the group consisting of calcium carbonate, limestone, dolomite, Portland cement, gypsum, drilling mud, magnesium hydroxide, and magnesium carbonate.

4. The method of claim 1 wherein the settling agent is the sludge solids from a brine purifier which purifies brine prior to its being conveyed to an electrolytic chlorine cell, said sludge composition comprising a predominant amount of calcium carbonate, a minor amount of magnesium hydroxide and trace amounts of other metal compounds.

5. The method of claim 1 wherein the settling agent is employed in an amount by weight which is at least as much as the amount by weight of asbestos.

6. The method of claim 1 wherein the underground cavity is a brine well.

7. The method of claim 1 wherein there is also added a flocculating agent in an amount of at least about 2 ppm, based on aqueous waste material, said flocculating agent being an organic, water-dispersible polymer.

8. The method of claim 7 wherein the flocculating agent is at least one compound selected from the group consisting of polyacrylamide, polyalkylene polyamine, and polyalkylenimine.

9. The method of claim 1 wherein the weight of the settling agent is an amount which is from about 3 to about 5 times the weight of the asbestos.

10. A method for safely disposing of aqueous material containing waste asbestos which comprises:
  a. admixing with said agueous material an amount of a particulate, relatively dense, substantial insoluble settling agent which contains at least one alkaline earth metal compound which amount is greater by weight than the weight of asbestos, and at least about 2 parts per million of a flocculating agent selected from the group consisting of polyacrylamide, polyalkylene polyamine, and polyethylenimine, and
  b. conveying said aqueous mixture into a brine well.

* * * * *

UNITED STATES PATENT OFFICE
CERTIFICATE OF CORRECTION

PATENT NO. : 3,887,462
DATED : June 3, 1975
INVENTOR(S) : Thomas F. LaGess and Valroy Henry Maudlin It is certified that error appears in the above-identified patent and that said Letters Patent are hereby corrected as shown below:

Correct inventor's name spelled as "Lagess" to --LaGess--

Col. 6, line 26, correct "agueous" to --aqueous--

Signed and Sealed this twenty-first Day of October 1975

[SEAL]

Attest:

RUTH C. MASON
*Attesting Officer*

C. MARSHALL DANN
*Commissioner of Patents and Trademarks*